(12) United States Patent
Hart et al.

(10) Patent No.: US 8,758,189 B2
(45) Date of Patent: Jun. 24, 2014

(54) MULTIPLE SPEED TRANSMISSION HAVING A BAND BRAKE

(75) Inventors: James M. Hart, Belleville, MI (US); Daryl A. Wilton, Macomb, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 240 days.

(21) Appl. No.: 13/359,083

(22) Filed: Jan. 26, 2012

(65) Prior Publication Data
US 2012/0214636 A1 Aug. 23, 2012

Related U.S. Application Data

(60) Provisional application No. 61/444,035, filed on Feb. 17, 2011.

(51) Int. Cl.
*F16H 3/66* (2006.01)
*F16H 1/46* (2006.01)

(52) U.S. Cl.
USPC .......................................... 475/286; 475/290

(58) Field of Classification Search
USPC ................... 475/272–291, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,285,069 B2* | 10/2007 | Klemen | 475/275 |
| 2007/0072732 A1* | 3/2007 | Klemen | 475/280 |
| 2009/0088289 A1* | 4/2009 | Baldwin | 475/276 |
| 2012/0178572 A1* | 7/2012 | Hart | 475/116 |
| 2012/0178578 A1* | 7/2012 | Mellet et al. | 475/254 |
| 2012/0178580 A1* | 7/2012 | Wittkopp et al. | 475/275 |
| 2012/0178581 A1* | 7/2012 | Wittkopp et al. | 475/275 |
| 2012/0178582 A1* | 7/2012 | Wittkopp et al. | 475/276 |
| 2012/0214635 A1* | 8/2012 | Mellet et al. | 475/276 |
| 2013/0203550 A1* | 8/2013 | Mellet et al. | 475/276 |
| 2013/0225358 A1* | 8/2013 | Singh | 475/276 |

* cited by examiner

*Primary Examiner* — Roger Pang

(57) ABSTRACT

An automatic transmission includes an input shaft or member, an output shaft or member and three simple and one compound planetary gear assemblies each including a sun gear, a planet gear carrier with a plurality of planet gears and a ring gear. The input shaft or member is coupled to the sun gear of the second planetary gear assembly and the output shaft is coupled to the planet gear carrier of the fourth planetary gear assembly. The transmission also includes six torque transmitting devices: one band brake, three friction brakes and two friction clutches.

18 Claims, 2 Drawing Sheets

| GEAR | BRAKES | | | | CLUTCHES | |
|---|---|---|---|---|---|---|
| STATE | 62 | 64 | 66 | 68 | 74 | 72 |
| REV | X | | | X | | |
| N | | | | O | | |
| 1ST | | X | | X | | |
| 2ND | | | | X | | X |
| 3RD | | X | | | | X |
| 4TH | | | X | | | X |
| 5TH | X | | | | | X |
| 6TH | | | | | X | X |
| 7TH | X | | | | X | |
| 8TH | | | X | | X | |
| 9TH | | X | | | X | |

X = ON - ENGAGED CARRYING TORQUE
O = ON - ENGAGED NOT CARRYING TORQUE

MULTIPLE SPEED TRANSMISSION HAVING A BAND BRAKE

CROSS REFERENCE TO RELATED APPLICATION

This patent application claims the benefit of U.S. Provisional Patent Application Ser. No. 61/444,035, filed Feb. 17, 2011, which is hereby incorporated in its entirety herein by reference.

FIELD

The present disclosure relates to a multiple speed automatic transmission having a plurality of planetary gear assemblies and more particularly to a multiple speed automatic transmission having a plurality of planetary gear assemblies, a band brake, three friction brakes and two friction clutches.

BACKGROUND

The statements in this section merely provide background information related to the present disclosure and may or may not constitute prior art.

A typical modern multiple speed automatic transmission includes a plurality of planetary gear assemblies and selectively engaged friction clutches and friction brakes that achieve a plurality of forward speeds or gear ratios and reverse.

Increasingly demanding economic, performance and efficiency goals continue to encourage automatic transmission research and development. A result of this effort has been a steady increase in the number of available forward speeds or gear ratios in an automatic transmission.

In such transmissions, the elements of a plurality of planetary gear assemblies are (1) connected by permanent coupling members, (2) selectively connected by friction clutches or (3) selectively grounded by friction brakes. Specific combinations of the clutches and brakes are engaged or activated in sequence to provide a predetermined sequence of numerically related gear ratios and thus output speeds and torques.

While such transmissions closely match the power and torque outputs of an engine to the vehicle speed and load, six, seven, eight and nine speed automatic transmissions are known to have drawbacks. Two known and related drawbacks are complexity and cost. A corollary to such complexity is frictional loss. Each of the torque transmitting devices, namely, the clutches and brakes, contributes to frictional losses, referred to as spin losses, when they are not engaged. Three primary factors influence overall transmission spin losses: the total number of clutches and brakes, the size or torque capacity of the clutch or brake and the instantaneous speed difference between the input and output of the clutch or brake.

The present invention provides an automatic transmission having nine forward speeds or gear ratios and reverse which exhibits reduced frictional losses.

SUMMARY

The present invention provides a multiple speed automatic transmission. The automatic transmission includes an input shaft or member, an output shaft or member and three simple and one compound planetary gear assemblies each including a sun gear, a planet gear carrier with a plurality of planet gears and a ring gear. The input shaft or member is coupled to the sun gear of the second planetary gear assembly and the output shaft is coupled to the planet gear carrier of the fourth planetary gear assembly. The transmission also includes six torque transmitting devices: one band brake, three friction brakes and two friction clutches.

The transmission further includes a plurality of fixed or rigid connections between the various components. A first connection couples the ring gear of the first planetary gear assembly to the ring gear of the second planetary gear assembly. A second connection couples the planet gear carrier of the first planetary gear assembly to the planet gear carrier of the second planetary gear assembly. A third connection couples the planet gear carrier of the second planetary gear assembly to the sun gear of the third planetary gear assembly. A fourth connection couples the planet gear carrier of the third planetary gear assembly to the ring gear of the fourth planetary gear assembly. A fifth connection couples the ring gear of the third planetary gear assembly to the planet gear carrier of the fourth planetary gear assembly. A sixth connection couples the sun gear of the first planetary gear assembly to a band brake. In certain layouts of the planetary gear assemblies, one or more of the connections may be achieved by an integral or common component, thereby essentially eliminating a shaft, quill or other fixed or rigid connecting member.

Thus it is an aspect of the present invention to provide a multiple speed automatic transmission.

It is a further aspect of the present invention to provide a nine speed automatic transmission.

It is a still further aspect of the present invention to provide an automatic transmission having three simple and one compound planetary gear assemblies.

It is a still further aspect of the present invention to provide an automatic transmission having six torque transmitting devices.

It is a still further aspect of the present invention to provide an automatic transmission having one band brake, three friction brakes and two friction clutches.

It is a still further aspect of the present invention to provide an automatic transmission having a plurality of fixed connections between components of the transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
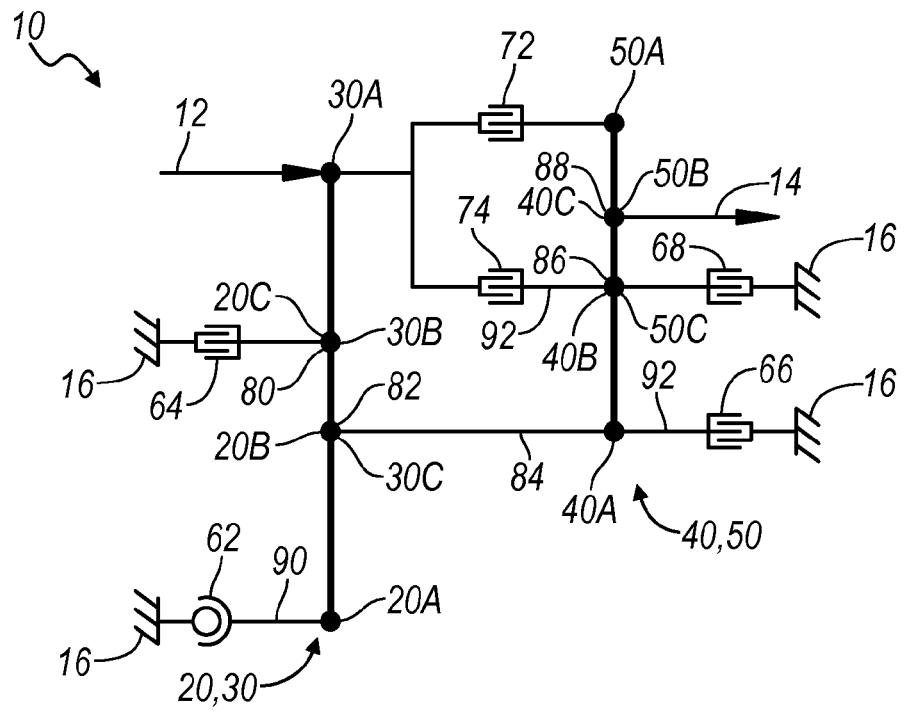
FIG. 1 is a lever diagram of a nine speed automatic transmission according to the present invention.

With reference to FIG. 1, a multiple, i.e., nine, speed automatic transmission 10 according to the present invention is illustrated in a lever diagram. A lever diagram is a schematic representation of the components of an automatic transmission wherein a planetary gear assembly is represented by a vertical bar or lever and the components of the planetary gear assemblies such as sun gears, planet gear carriers and ring gears are represented by nodes. The relative lengths of the vertical bars between the nodes represent the ratios between the components. Where a component of one planetary gear assembly is coupled directly to a component of another planetary gear assembly, two levers may be combined into a single lever having, in this instance, four nodes. Because of such direct coupling, the four planetary gear assemblies of the present invention are represented by only two vertical bars or levers. Mechanical couplings or interconnections between the nodes of the planetary gear assemblies are also represented by horizontal lines and torque transmitting devices such as friction clutches and brakes are represented by interleaved or nested fingers and band brakes are represented by nested circles. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The multiple speed automatic transmission 10 includes an input shaft or member 12 which receives drive torque, an output shaft or member 14 which delivers drive torque and a housing 16 which is referred to as "ground" with reference to FIG. 1. The automatic transmission 10 also includes four planetary gear assemblies. A first planetary gear assembly 20 includes a first node 20A, a second node 20B and a third node 20C. A second planetary gear assembly 30 includes a first node 30A which is coupled to and driven by the input shaft or member 12, a second node 30B which is common with the third node 20C of the first planetary gear assembly 20 and a third node 30C. A third planetary gear assembly 40 includes a first node 40A, a second node 40B and a third node 40C which is coupled to and drives the output shaft or member 14. Finally, a fourth planetary gear assembly 50 includes a first node 50A, a second node 50B which is common with the third node 40C of the third planetary gear assembly 40 and thus also drives the output shaft or member 14 and a third node 50C which is common with the second node 40B of the fourth planetary gear assembly 40.

Additionally, the automatic transmission 10 includes a plurality of selectively engageable torque transmitting devices, namely, brakes and clutches. As utilized herein, the term "friction brake" refers to any torque transmitting device having a first plurality of rotatable friction plates or discs which are interleaved with a second, stationary plurality of plates or discs and which are compressed by an associated operator or actuator to ground or brake the rotating plates or discs to the housing 16. The term "friction clutch" refers to a similar device in which the first and second pluralities of interleaved friction plates or discs transmit torque between two rotatable members. The term "band brake" refers to any torque transmitting device having a belt or band which substantially surrounds a rotating drum or annular member and which may be tightened by an associated operator or actuator to ground or brake the rotating member to the housing 16. It should be understood, however, that other clutch types and configurations are within the purview of this invention.

A first, band brake 62 is operably disposed between the first node 20A of the first planetary gear assembly 20 and ground (the housing 16). A second, friction brake 64 is operably disposed between the third node 20C of the first planetary gear assembly 20 (and the second node 30B of the second planetary gear assembly 30) and ground (the housing 16). A third, friction brake 66 is operably disposed between the first node 40A of the third planetary gear assembly 40 and ground (the housing 16). A fourth, friction brake 68 is operably disposed between the third node 50C of the fourth planetary gear assembly 50 and ground (the housing 16).

A first friction clutch 72 is operably disposed between the first node 30A of the second planetary gear assembly 30 and the first node 50A of the fourth planetary gear assembly 50. A second friction clutch 74 is operably disposed between the first node 30A of the second planetary gear assembly 30 and the third node 50C of the fourth planetary gear assembly 50.

Figure 2:
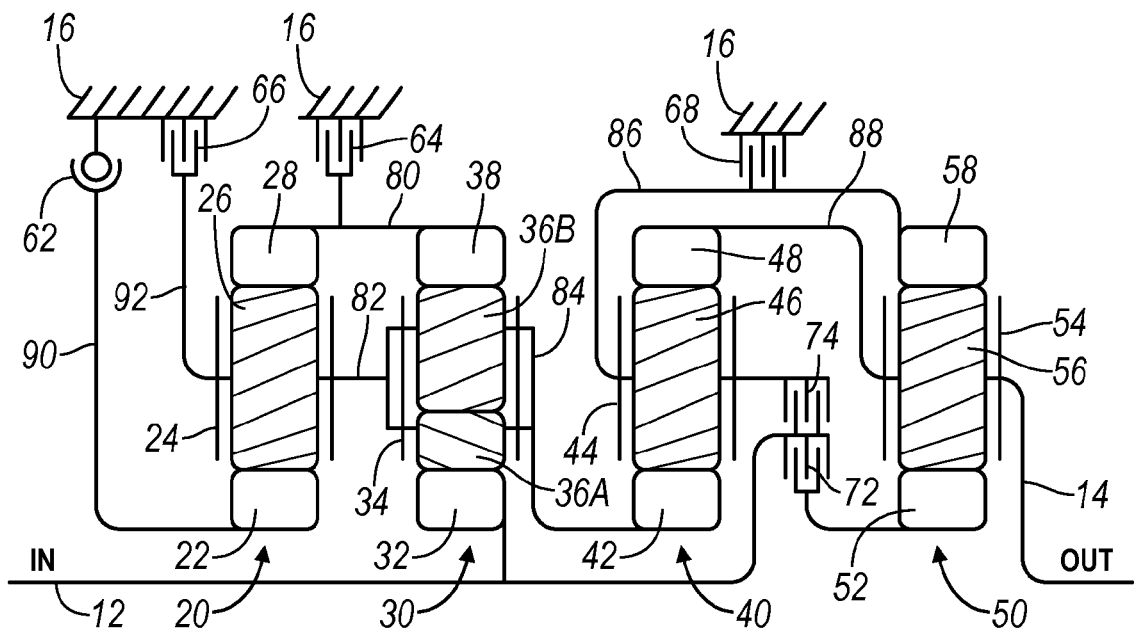
FIG. 2 is a stick diagram of an embodiment of a nine speed automatic transmission according to the present invention.

Referring now to FIGS. 1 and 2, there are also a plurality of fixed, i.e., positive or direct, connections or couplings between various components of the planetary gear assemblies 20, 30, 40 and 50. Because the first planetary gear assembly 20 and the second planetary gear assembly 30 are combined in a single lever in FIG. 1 and the third planetary gear assembly 40 and the fourth planetary gear assembly 50 are also combined in a single lever in FIG. 1, many of the fixed connections are contained within or are integral components of certain nodes. Accordingly, many of the fixed connections are only clearly visible in FIG. 2.

A first shaft, quill or member 80 connects the third node 20C of the first planetary gear assembly 20 to the second node 30B of the second planetary gear assembly 30. A second shaft, quill or member 82 connects the second node 20B of the first planetary gear assembly 20 to the third node 30C of the second planetary gear assembly 30. A third shaft, quill or member 84 connects the third node 30C of the second planetary gear assembly 30 to the first node 40A of the third planetary gear assembly 40. A fourth shaft, quill or member 86 connects the second node 40B of the third planetary gear assembly 40 to the third node 50C of the fourth planetary gear assembly 50. A fifth shaft, quill or member 88 connects the third node 40C of the third planetary gear assembly 40 to the second node 50B of the fourth planetary gear assembly 50. Because of the layout of the components in the first embodiment of the automatic transmission 10, two additional fixed connections such as shafts, quills or members may be utilized. A sixth shaft, quill or member 90 connects the first, band brake 62 to the first node 20A of the first planetary gear assembly 20 and a seventh shaft, quill or member 92 connects the first node 40A of the third planetary gear assembly 40 (and the third node 30C of the second planetary gear assembly 30 and the first node 20A of the first planetary gear assembly 20 through the third shaft, quill or member 84) to the third friction clutch 66.

In FIG. 2, the levers have been replaced by three simple and one compound planetary gear assemblies 20, 30, 40, and 50 and the nodes 20A, 20B, 20C, 30A, 30B, 30C, 40A, 40B, 40C, 50A, 50B and 50C have been replaced by the components of the planetary gear assemblies: sun gears, planetary gear carriers having planet gears and ring gears. Thus, the first, simple planetary gear assembly 20 includes a first sun gear 22, a first planet gear carrier 24 and a first ring gear 28. Rotatably disposed in the first planet gear carrier 24 are a first plurality of planet gears 26, one of which is illustrated in FIG. 2. Each of the first plurality of planet gears 26 is in constant mesh with the first sun gear 22 and the first ring gear 28. The second, compound planetary gear assembly 30 includes a second sun gear 32, a second planet gear carrier 34 and a second ring gear 38. Rotatably disposed in the second planet gear carrier 34 on stub shafts and/or bearings (not illustrated) are a first plurality of second planet gears 36A, one of which is illustrated in FIG. 2, which are in constant mesh with a respective one of a second plurality of second planet gears 36B, one of which is illustrated in FIG. 2. Each of the first plurality of second planet gears 36A is in constant mesh with the second sun gear 32 and each of the second plurality of second planet gears 36B is in constant mesh with the second ring gear 38.

The third, simple planetary gear assembly 40 includes a third sun gear 42, a third planet gear carrier 44 and a third ring gear 48. Rotatably disposed in the third planet gear carrier 44 on stub shafts and/or bearings (not illustrated) are a plurality of third planet gears 46, one of which is illustrated in FIG. 2. Each of the plurality of third planet gears 46 is in constant mesh with the third sun gear 42 and the third ring gear 48. The fourth, simple planetary gear assembly 50 includes a fourth sun gear 52, a fourth planet gear carrier 54 and a fourth ring gear 58. Rotatably disposed in the fourth planet gear carrier 54 on stub shafts and/or bearings (not illustrated) are a plurality of fourth planet gears 56, one of which is illustrated in FIG. 2. Each of the plurality of fourth planet gears 56 is in constant mesh with the fourth sun gear 52 and the fourth ring gear 58.

The first, band brake 62 is connected between the housing 16 and the first sun gear 22 of the first planetary gear assembly 20 by the sixth shaft, quill or member 90. The second, friction brake 64 is connected between the housing 16 and the first ring gear 28 of the first planetary gear assembly 20 and the second ring gear 38 of the second planetary gear assembly 30 by the first shaft, quill or member 80. The third, friction brake 66 is connected between the housing 16 and the first planet gear carrier 24 of the first planetary gear assembly 20 by the seventh shaft, quill or member 92 and to the second planet gear carrier 34 of the second planetary gear assembly 30 by the second shaft, quill or member 82. The fourth, friction brake 68 is connected between the housing 16 and the third planet gear carrier 44 of the third planetary gear assembly 40 and the fourth ring gear 58 of the fourth planetary gear assembly 50 by the fourth shaft, quill or member 86.

The first friction clutch 72 is connected between the input shaft 12 and the fourth sun gear 52 of the fourth planetary gear assembly 50. The second friction clutch 74 is connected between the input shaft 12 and the third planet gear carrier 44 of the third planetary gear assembly 40 and to the fourth ring gear 58 of the fourth planetary gear assembly 50 by the fourth shaft, quill or member 86.

The second shaft, quill or member 82 connects the first planet gear carrier 24 of the first planetary gear assembly 20 to the second planet gear carrier 34 of the second planetary gear assembly 30. The third shaft, quill or member 84 connects the second planet gear carrier 34 of the second planetary gear assembly 30 to the third sun gear 42 of the third planetary gear assembly 40. The fifth shaft, quill or member 88 connects the third ring gear 48 of the third planetary gear assembly 40 to the fourth planetary gear carrier 54 of the fourth planetary gear assembly 50.

Figures 3, 4:
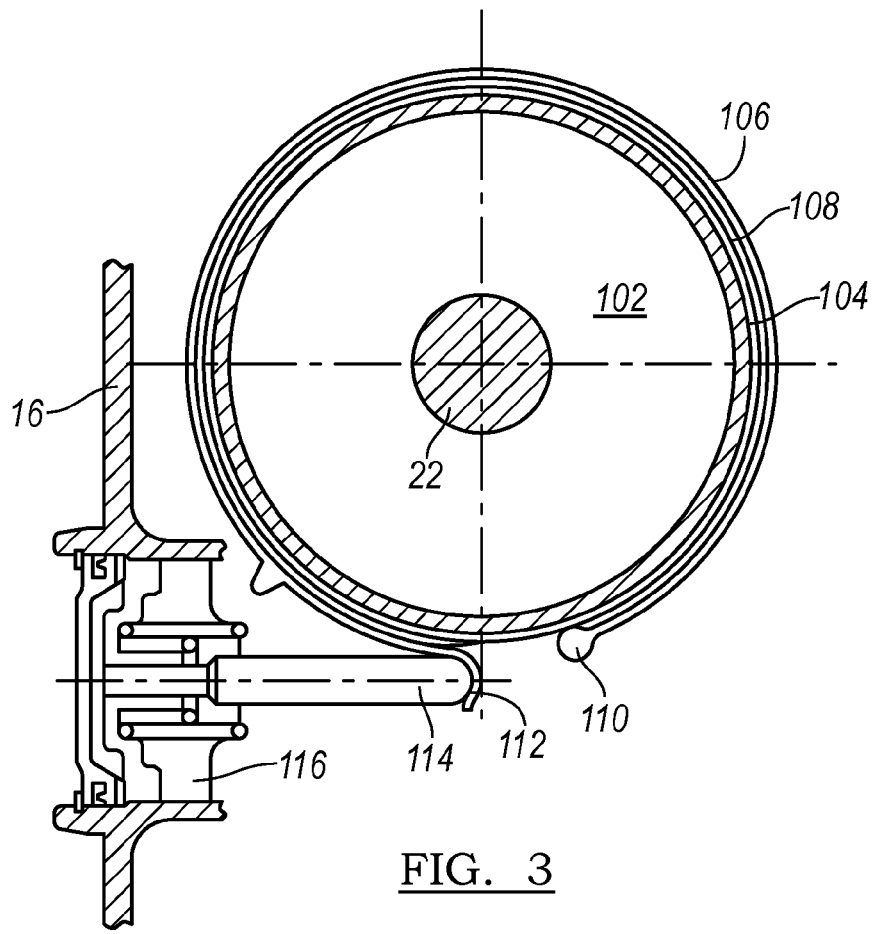
FIG. 3 is a full sectional view of a band brake in a nine speed automatic transmission according to the present invention.
FIG. 4 is a truth table presenting the various combinations of engaged brakes and clutches which achieve a given forward or reverse gear or speed ratio and provide nine forward speeds and reverse in a nine speed automatic transmission according to the present invention.

Referring now to FIG. 3, a cross-sectional view through the housing 16 of the transmission 10 and the first planetary gear assembly 20 illustrates a brake drum, quill or annular member 102 which is coupled to the first sun gear 22 of the first planetary gear assembly 20. The drum, quill or member 102 defines an outer annular surface 104. Disposed about the outer annular surface 104 is a brake band 106 which includes friction material 108 on its inner surface. One end of the brake band 106 is secured to the housing 16 by a suitable attachment device or fastener 110 and the other end includes a lug or ear 112 which is engaged by a shaft, rod or output member 114 of a bi-directional linear actuator 116. The linear actuator 116 may be electrically or hydraulically powered servo device.

Actuation or energization of the linear actuator 116 translates the shaft, rod or member 114 toward the lug or ear 112 and tightly wraps the brake band 106 around the annular surface 104 thereby inhibiting rotation of the brake drum, quill or member 102 and the first sun gear 22.

Referring now to FIG. 4, the sequence of operation, i.e., the activation or engagement, of the six torque transmitting devices, which provides nine forward speeds or gear ratios and reverse is illustrated. FIG. 4 is a truth table which presents the various combinations of brakes and clutches that are activated or engaged to achieve nine forward speeds and reverse. An "X" appearing in a column indicates activation or engagement if the subject brake or clutch and that the device is carrying torque. An "O" appearing in a column indicates that the subject brake or clutch is activated or engaged but that it is not carrying torque. No entry in a column indicates that the subject brake or clutch is inactive or disengaged. The actual gear ratios and ratio steps may be adjusted or varied over significant ranges to accommodate various applications and operational criteria of the automatic transmission 10.

To engage reverse, referred to in FIG. 4 as "Rev," the first, band brake 62 and the fourth, friction brake 68 are engaged or activated. In neutral, referred to by the letter "N" in FIG. 4, only the fourth, friction brake 68 is engaged or activated but it is not carrying torque.

First gear is achieved by activating or engaging the second, friction brake 64 while maintaining activation or engagement of the fourth, friction brake 68. Second gear is achieved by deactivating or disengaging the second, friction brake 64 and activating or engaging the first friction clutch 72 while maintaining activation or engagement of the fourth, friction brake 68.

Third gear is achieved by deactivating or disengaging the fourth, friction brake 68 and engaging or activating the second, friction brake 64 while maintaining activation or engagement of the first friction clutch 72. Fourth gear is achieved by deactivating or disengaging the second, friction brake 64 and engaging or activating the third, friction brake 66 while maintaining engagement of the first friction clutch 72.

Fifth gear is achieved by deactivating or disengaging the third, friction brake 66 and engaging or activating the first, band brake 62 while maintaining engagement of the first friction clutch 72. Sixth gear is achieved by deactivating or disengaging the first, band brake 62 and engaging or activating the second friction clutch 74 while maintaining engagement of the first friction clutch 72.

Seventh gear is achieved by deactivating or disengaging the first friction clutch 72 and engaging or activating the first, band brake 62 while maintaining engagement of the second friction clutch 74. Eighth gear is achieved by deactivating or disengaging the first, band brake 62 and engaging or activating the third, friction brake 66 while maintaining engagement of the second friction clutch 74. Ninth gear is achieved by deactivating or disengaging the third, friction brake 66 and activating or engaging the second, friction brake 64 while maintaining engagement of the second friction clutch 74.

It will be appreciated that the automatic transmission 10 incorporating the band brake 62 according to the present invention provides reduced spin loss due to the improved release of the brake band 106 and thus reduced drag between the input (the sun gear 22) and ground (the housing 16) of the band brake 62. The band brake 62 also provides improved packaging flexibility relative to a disc clutch pack and operator because the linear actuator 116 may be mounted at essentially any radial position about the transmission housing 16.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising, in combination,
   a first, a second, a third and a fourth planetary gear assembly, each of said planetary gear assemblies having three members,
   an input member connected to one of said members of said second planetary gear assembly,
   an output member connected to one of said members of said fourth planetary gear assembly,
   one of said members of said first planetary gear assembly coupled to another of said members of said second planetary gear assembly,
   another of said members of said first planetary gear assembly coupled to yet another of said members of said second planetary gear assembly,
   a member for connecting said yet another of said members of said second planetary gear assembly with one of said members of said third planetary gear assembly,
   another of said members of said third planetary gear assembly coupled to another of said members of said fourth planetary gear assembly,
   yet another of said members of said third planetary gear assembly coupled to said one of said members of said fourth planetary gear assembly,
   a band brake coupled to yet another of said members of said first planetary gear assembly, and
   a plurality of torque transmitting devices selectively engageable to connect: said one of said members of said first planetary gear assembly and said another of said members of said second planetary gear assembly to ground, said another of said members of said third planetary gear assembly and said another of said members of said fourth planetary gear assembly to ground, said input member to said another of said members of said third planetary gear assembly, said input member to said yet another of said members of said fourth planetary gear assembly, and said another of said members of said first planetary gear assembly and another of said members of said second planetary gear assembly to ground.

2. The multiple speed automatic transmission of claim 1 wherein each of said three members of said first, second, third and fourth planetary gear assemblies is one of a sun gear, a ring gear and a planet gear carrier.

3. The multiple speed automatic transmission of claim 1 wherein said one member of said first planetary gear assembly is a ring gear, said another member of said first planetary gear assembly is a planet gear carrier and said yet another member of said first planetary gear assembly is a sun gear.

4. The multiple speed automatic transmission of claim 1 wherein said second planetary gear assembly is a compound planetary gear assembly and one member of said second planetary gear assembly is a sun gear, said another member of said second planetary gear assembly is a ring gear and said yet another member of said second planetary gear assembly is a planet gear carrier.

5. The multiple speed automatic transmission of claim 1 wherein said one member of said third planetary gear assembly is a sun gear, said another member of said third planetary gear assembly is a planet gear carrier and said yet another member of said third planetary gear assembly is a ring gear.

6. The multiple speed automatic transmission of claim 1 wherein said one member of said fourth planetary gear assembly is a planet gear carrier, said another member of said fourth planetary gear assembly is a ring gear and said yet another member of said fourth planetary gear assembly is a sun gear.

7. A multiple speed automatic transmission comprising, in combination,
   a first, a second, a third and a fourth planetary gear assembly, each of said planetary gear assemblies having three members,
   an input member connected to one of said members of said second planetary gear assembly,
   an output member connected to one of said members of said fourth planetary gear assembly,
   a first member for connecting one of said members of said first planetary gear assembly with another one of said members of said second planetary gear assembly,
   a second member for connecting another of said members of said first planetary gear assembly with yet another of said members of said second planetary gear assembly,
   a third member for connecting said yet another of said members of said second planetary gear assembly with one of said members of said third planetary gear assembly,
   a fourth member for connecting another member of said third planetary gear assembly with another of said members of said fourth planetary gear assembly,
   a fifth member for connecting yet another of said members of said third planetary gear assembly with said one of said members of said fourth planetary gear assembly,
   a band brake,
   a sixth member for connecting said band brake to yet another of said members of said first planetary gear assembly, and
   a plurality of torque transmitting devices selectively engageable to connect: said first connecting member to ground, said second connecting member to ground, said fourth connecting member to ground, said input member to said yet another of said members of said fourth planetary gear assembly and said input member to said another of said members of said third planetary gear assembly.

8. The multiple speed automatic transmission of claim 7 wherein a first group of said plurality of torque transmitting devices are brakes and a second group of said plurality of torque transmitting devices are clutches.

9. The multiple speed automatic transmission of claim 7 wherein each of said three members of said first, second, third and fourth planetary gear assemblies is one of a sun gear, a ring gear and a planet gear carrier.

10. The multiple speed automatic transmission of claim 7 wherein said one member of said first planetary gear assembly is a ring gear, said another member of said first planetary gear assembly is a planet gear carrier and said yet another member of said first planetary gear assembly is a sun gear.

11. The multiple speed automatic transmission of claim 7 wherein said one member of said second planetary gear assembly is a sun gear, said another member of said second planetary gear assembly is a ring gear and said yet another member of said second planetary gear assembly is a planet gear carrier.

12. The multiple speed automatic transmission of claim 7 wherein said one member of said third planetary gear assembly is a sun gear, said another member of said third planetary gear assembly is a planet gear carrier and said yet another member of said third planetary gear assembly is a ring gear.

13. The multiple speed automatic transmission of claim 7 wherein said one member of said fourth planetary gear assembly is a planet gear carrier, said another member of said fourth planetary gear assembly is a ring gear and said yet another member of said fourth planetary gear assembly is a sun gear.

14. The multiple speed automatic transmission of claim 7 wherein said second planetary gear assembly is a compound planetary gear assembly.

15. A multiple speed automatic transmission comprising, in combination,
an input member,
an output member,
a first planetary gear assembly having a sun gear, a planet gear carrier rotatably supporting a plurality of planet gears and a ring gear,
a second planetary gear assembly having a sun gear coupled to and driven by said input member, a planet gear carrier coupled to said planet gear carrier of said first planetary gear assembly and rotatably supporting a plurality of planet gears and a ring gear coupled to said ring gear of said first planetary gear assembly,
a third planetary gear assembly having a sun gear coupled to said planetary gear carrier of said second planetary gear assembly, a planet gear carrier rotatably supporting a plurality of planet gears and a ring gear,
a fourth planetary gear assembly having a sun gear, a planet gear carrier coupled to and driving said output member, coupled to said ring gear of said third planetary gear assembly and rotatably supporting a plurality of planet gears and a ring gear coupled to said planet gear carrier of said third planetary gear assembly, and
a band brake disposed between said sun gear of said first planetary gear assembly and a housing, a first friction brake disposed between said ring gears of said first and said second planetary gear assemblies and said housing, a second friction brake disposed between said planet gear carrier of said first planetary gear assembly and said housing, and a third friction brake disposed between said planet gear carrier of said third planetary gear assembly and said ring gear of said fourth planetary gear assembly and said housing.

16. The multiple speed automatic transmission of claim 15 further including a first friction clutch disposed between said input member and said sun gear of said fourth planetary gear assembly and a second friction clutch disposed between said input member and said planet gear carrier of said third planetary gear assembly.

17. The multiple speed automatic transmission of claim 15 wherein said first, third and fourth planetary gear assemblies are simple planetary gear assemblies and said second planetary gear assembly is a compound planetary gear assembly.

18. The multiple speed automatic transmission of claim 15 further including a hydraulic actuator for engaging said band brake.

* * * * *